(12) United States Patent
Sargeant et al.

(10) Patent No.: US 12,424,837 B2
(45) Date of Patent: *Sep. 23, 2025

(54) POWER SUPPLY DELIVERY SYSTEM FOR SPLITTING AND COMBINING POWER

(71) Applicant: GYRUS ACMI, INC, Westborough, MA (US)

(72) Inventors: Matthew Sargeant, Westford, MA (US); Geophrey J. McCormis, Leominster, MA (US)

(73) Assignee: Gyrus ACMI, Inc., Westborough, MA (US)

( * ) Notice: Subject to any disclaimer, the term of this patent is extended or adjusted under 35 U.S.C. 154(b) by 652 days.

This patent is subject to a terminal disclaimer.

(21) Appl. No.: 17/804,902

(22) Filed: Jun. 1, 2022

(65) Prior Publication Data

US 2022/0329059 A1    Oct. 13, 2022

Related U.S. Application Data

(63) Continuation of application No. 16/565,646, filed on Sep. 10, 2019, now Pat. No. 11,394,192.

(Continued)

(51) Int. Cl.
*H02H 3/08* (2006.01)
*H02H 1/00* (2006.01)
(Continued)

(52) U.S. Cl.
CPC ............ *H02H 3/08* (2013.01); *H02H 1/0007* (2013.01); *H02H 3/025* (2013.01); *H02H 3/04* (2013.01); *H02H 7/20* (2013.01)

(58) Field of Classification Search
CPC ............ H02M 1/08; H02M 1/32; H02M 7/00; H02H 3/04; H02H 3/05; H02H 3/063;
(Continued)

(56) References Cited

U.S. PATENT DOCUMENTS 3,729,671 A    4/1973  Jeffery et al.
4,173,714 A    11/1979  Bloch et al.
(Continued)

OTHER PUBLICATIONS

U.S. Appl. No. 16/565,646 U.S. Pat. No. 11,394,192, filed Sep. 10, 2019, Power Supply Delivery System For Splitting and Combining Power.

(Continued)

*Primary Examiner* — Sean Kayes
*Assistant Examiner* — Nusrat Quddus
(74) *Attorney, Agent, or Firm* — Schwegman Lundberg & Woessner, P.A.

(57) ABSTRACT

A power supply delivery system is provided. The power supply delivery system includes a source module and a load module. The source module includes an input coupled to a Class 1 power source, plural outputs coupled to plural Class 2 cables, and circuitry coupled to the input and the plural outputs. The circuitry splits power received via the input into a plural Class 2 channels and conducts the plural Class 2 channels to the plurality of outputs. The load module includes plural inputs coupled to the plural Class 2 cables, an output coupled to a Class 1 load, and circuitry coupled to the plural inputs and the output. The circuitry combines the plurality of Class 2 channels received via the plural inputs into a single Class 1 channel and conducts the single Class 1 channel to the output.

20 Claims, 10 Drawing Sheets

Related U.S. Application Data (60) Provisional application No. 62/729,109, filed on Sep. 10, 2018.

(51) Int. Cl.
*H02H 3/02* (2006.01)
*H02H 3/04* (2006.01)
*H02H 7/20* (2006.01)

(58) Field of Classification Search
CPC .......... H02H 3/08; H02H 3/025; H02H 3/087; H02H 3/18; H02H 3/202; H02H 3/42; H02H 1/0007; H02H 5/005; H02H 9/02; H02H 9/046; H03K 17/081; G05F 1/40; H01R 9/03; A61B 1/00027; H02J 1/08; H02J 1/082; H02J 1/086; H02J 3/007; H02J 3/0073; H02J 9/00; H02J 2310/12
See application file for complete search history.

(56) References Cited

U.S. PATENT DOCUMENTS

| | | | |
|---|---|---|---|
| 4,979,066 A | 12/1990 | Kawata et al. | |
| 5,424,894 A | 6/1995 | Briscall et al. | |
| 5,448,443 A | 9/1995 | Muelleman | |
| 5,491,463 A | 2/1996 | Sargeant et al. | |
| 5,706,157 A | 1/1998 | Galecki et al. | |
| 5,898,557 A | 4/1999 | Baba et al. | |
| 6,108,183 A | 8/2000 | Beene | |
| 6,215,633 B1 | 4/2001 | Galecki et al. | |
| 6,288,883 B1 | 9/2001 | Chen | |
| 6,841,979 B2 | 1/2005 | Berson et al. | |
| 7,337,336 B2 | 2/2008 | Ferentz et al. | |
| 7,408,755 B1 | 8/2008 | Ye et al. | |
| 7,974,112 B2 | 7/2011 | Balakrishnan et al. | |
| 8,320,089 B1* | 11/2012 | Chelcun | H02H 3/335 361/42 |
| 8,427,794 B2 | 4/2013 | Dvorak et al. | |
| 9,391,448 B2 | 7/2016 | Chesnut et al. | |
| 9,812,825 B2 | 11/2017 | Austermann, III et al. | |
| 11,394,192 B2 | 7/2022 | Sargeant et al. | |
| 2005/0044431 A1 | 2/2005 | Lang et al. | |
| 2006/0076830 A1 | 4/2006 | Hair et al. | |
| 2006/0226712 A1* | 10/2006 | Eldredge | H02M 3/157 307/154 |
| 2007/0287043 A1 | 12/2007 | Marsh et al. | |
| 2009/0015067 A1* | 1/2009 | Koehler | H02J 1/08 307/31 |
| 2009/0033356 A1 | 2/2009 | Starkell et al. | |
| 2016/0164295 A1 | 6/2016 | Cheng et al. | |
| 2017/0250828 A1 | 8/2017 | Buchanan | |
| 2018/0219635 A1 | 8/2018 | Sipes, Jr. | |
| 2019/0199536 A1 | 6/2019 | Kurk et al. | |
| 2020/0083696 A1 | 3/2020 | Sargeant et al. | |

OTHER PUBLICATIONS

"U.S. Appl. No. 16/565,646, 312 Amendment filed Jun. 3, 2022", 6 pgs.

"U.S. Appl. No. 16/565,646, Final Office Action mailed Sep. 20, 2021", 7 pgs.

"U.S. Appl. No. 16/565,646, Non Final Office Action mailed Mar. 16, 2021", 8 pgs.

"U.S. Appl. No. 16/565,646, Notice of Allowance mailed Mar. 4, 2022", 8 pgs.

"U.S. Appl. No. 16/565,646, Response filed Jun. 15, 2021 to Non Final Office Action mailed Mar. 16, 2021", 11 pgs.

"U.S. Appl. No. 16/565,646, Response filed Dec. 20, 2021 to Final Office Action mailed Sep. 20, 2021", 9 pgs.

"U.S. Appl. No. 16/565,646, Supplemental Notice of Allowability mailed Apr. 12, 2022", 5 pgs.

"U.S. Appl. No. 16/565,646, Supplemental Notice of Allowability mailed Jun. 23, 2022", 5 pgs.

* cited by examiner

POWER SUPPLY DELIVERY SYSTEM FOR SPLITTING AND COMBINING POWER

CROSS-REFERENCE TO RELATED APPLICATIONS

This application is a Continuation of U.S. patent application Ser. No. 16/565,646, filed Sep. 10, 2019, which claims the benefit of U.S. Provisional Patent Application Ser. No. 62/729,109, filed Sep. 10, 2018, the entire disclosures of which are hereby incorporated by reference herein.

TECHNICAL FIELD

The present disclosure relates generally to power supply systems, and more specifically, to power supply delivery systems for National Electrical Code 2017 (NEC) Class 1 circuits.

SUMMARY

Advances in audio-visual (AV) technology have resulted in the emergence of high-resolution displays that present images clearly and vividly. However, with these advances have come increases in demand for electric power to drive the displays. For instance, some currently available surgical displays (e.g., 4K displays) consume power in excess of 100 Watts while in operation.

Increases in demand for electric power can be problematic for existing power distribution and supply infrastructure. The NEC, which defines installation requirements for circuits within buildings and other structures, classifies circuits into categories including Class 1, Class 2, and Class 3. According to the NEC, Class 2 circuits may be sized to support up to 100 Volt-Amperes (VA). Most HD displays (including some surgical displays) fit nicely into the Class 2 category. However, other high-resolution displays (e.g., 4K displays) require circuits sized for more than 100 VA, which are classified as Class 1. As a result, preexisting Class 2 circuits cannot be used to supply power to these high-resolution displays. Furthermore, Class 1 and Class 2 or Class 3 power cannot coexist in the same conduit or wireway. Likewise, Class 1 power and communications cabling cannot coexist in the same conduit or wireway. This situation is particularly troublesome for integrated facilities with Class 2 infrastructure that cannot be easily modified to accommodate Class 1 circuits. These facilities are at risk for being unable to adopt new AV technology with increased power requirements.

Thus, and in accordance with various examples of the present disclosure, a power supply delivery system is described herein that can supply in excess of 100 Watts of power to a Class 1 circuit or load using Class 2 circuits. These examples maintain compliance with the NEC by supplying power from a remote Class 1 power supply (e.g., at a rack) by splitting the power over two or three current-limited Class 2 channels and then recombining the power at the load (e.g., at the display).

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein may be combined with any other example or feature. References to different examples are not necessarily mutually exclusive and are intended to indicate that a feature, structure, or characteristic described in connection with the example may be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, further explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

At least some examples disclosed herein include a power supply delivery system that conducts NEC Class 1 levels of power (e.g., in excess of 100 Watts) over Class 2 wiring. This power may be used, for example, to drive high-resolution displays, including video signals, audio signals, and control signals. These examples comply with the requirements of the National Fire Protection Association (NFPA) 70 2017 article 725.121 (A) (3) (2) and 725.121 (B) by, for example, splitting power received from a Class 1 power supply onto multiple Class 2 wires. The Class 2 wires carry the power toward a load (e.g., a surgical display). The wires, and the power they carry, are recombined prior to a connection to the load.

In some examples, the power supply delivery system is made up of two modules, a source end module (SEM) and a load end module (LEM). The SEM receives power from the Class 1 power supply and splits the power onto the Class 2 wires. The LEM receives the power from the SEM via the Class 2 wires and recombines the power onto a single cable coupled to a display. It will be understood that the SEM, the LEM, or any portions thereof can be of a modular design or integrated into or with other componentry. For example, the SEM, the LEM, or any portions thereof, can be implemented or internalized into a power supply, a display, or other device or componentry.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. Acts, components, elements and features discussed in connection with any one or more examples are not intended to be excluded from a similar role in any other examples.

Also, the phraseology and terminology used herein should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Power Supply Delivery System

Figure 1:
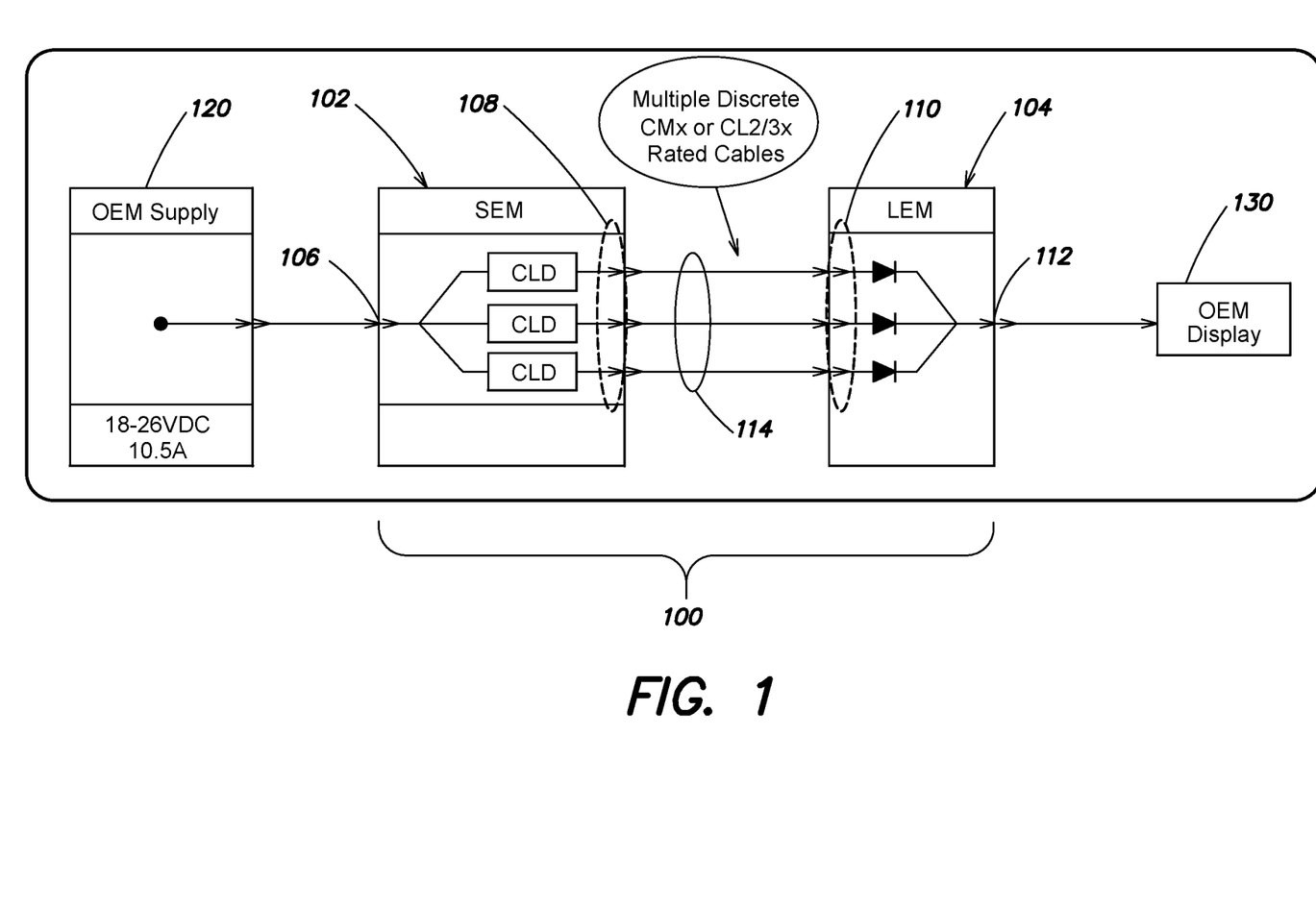
FIG. 1 is a schematic diagram illustrating a power supply delivery system in accordance with some examples of the present disclosure.

FIG. 1 illustrates a power supply delivery system 100 in accordance with some examples of the present disclosure. As shown in FIG. 1, the power supply delivery system 100 is electrically connected to a power supply 120, such as an 18-26 VDC, 10.5-amp power supply, and a load 130, such as a display. The power supply delivery system 100 includes an SEM 102 and an LEM 104. The SEM 102 includes an input 106 and outputs 108. The LEM 104 includes inputs 110 and an output 112. In some examples, the input 106 is configured to receive input voltage between 12 VDC and 26.2 VDC and a maximum current of 10.5 A. In these examples, electronics housed within the SEM may consume as much as 200 mA while the SEM is in operation. The outputs 108 of the SEM 102 are electrically connected to the inputs 110 of the LEM 104 via multiple discrete cables 114 each providing a power channel, such as Class 2 (CL2x) or Class 3 (CL3x) rated cables, or permitted substitutions pursuant to NEC article 725.154, or Communications (CMx) rated cables. As used herein, CL2x represents any listed NEC Class 2 cable type including CL2, CL2R, CL2P and CL2x. CL3x represents any listed NEC Class 3 cable type including CL3, CL3R, CL3P and CL3x. CMx represents any listed NEC Communications cable type including CM, CMG, CMR, CMP and CMX. The Class 2 safety current limit for each Class 2 channel conductor is 3.5 A. The Class 2 functional current limit for each Class 2 channel conductor is 3.4 A. The maximum voltage drop from the input 106 to the output 112 is 2.0V. Both the SEM 102 and the LEM 104 are described further below with reference to FIGS. 2-6.

Supply End Module

Figure 2A:
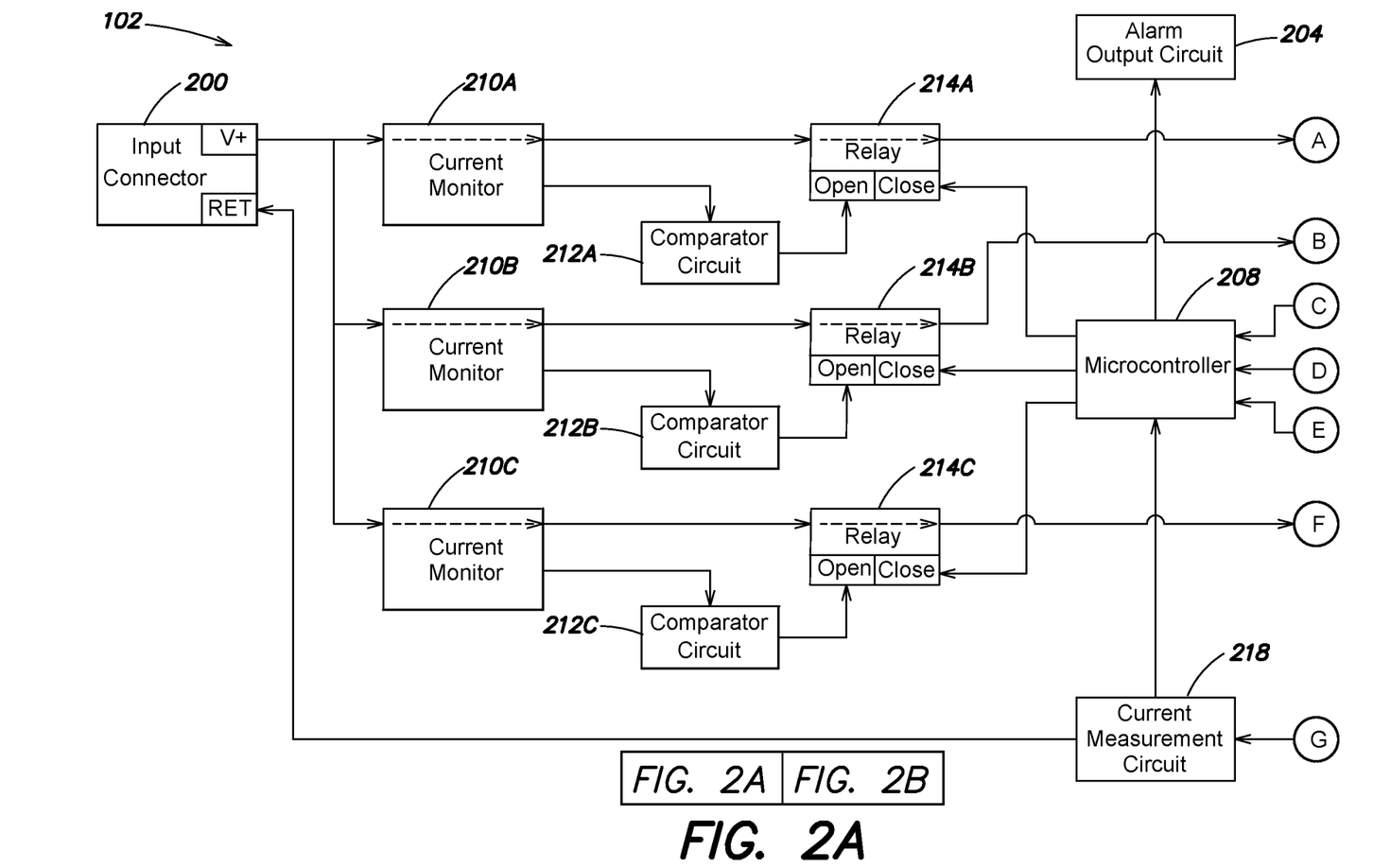
FIGS. 2A and 2B are a block diagram illustrating a circuit of a source end module (SEM) in accordance with some examples of the present disclosure.
Figure 2B:
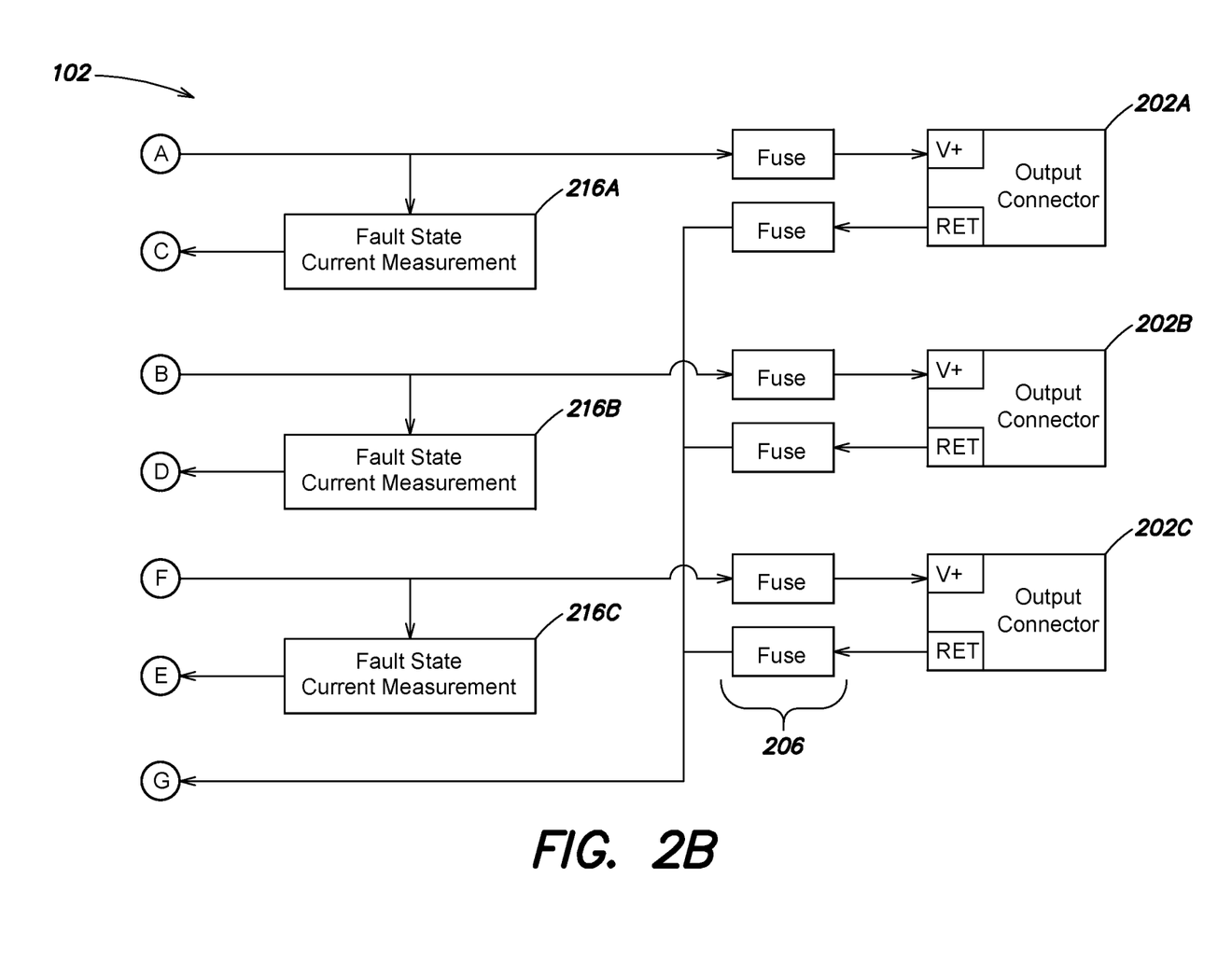

FIGS. 2A and 2B are a block diagram of a circuit of the SEM 102 in accordance with some examples of the present disclosure. As shown in FIGS. 2A and 2B, the electronics of the SEM 102 include a source input connector 200, a plurality of source output connectors 202A-202C, and SEM circuitry configured to be coupled or electrically connected to the source input connector 200 and each of the source output connectors 202A-202C. The SEM circuitry includes an alarm output circuit 204, a plurality of fuses 206, a microcontroller 208, a plurality of current monitors 210A-210C, a plurality of comparator circuits 212A-212A, a plurality of relays 214A-214C, a plurality of fault state current measurement circuits 216A-216C, and a current measurement circuit 218. It will be understood that, in some cases, the SEM circuitry can include more or fewer components than shown and described, and the functionality of some components can be combined with or separated from the components as shown and described.

In some examples, the SEM circuitry is configured to receive power from an external power source via the input 106 (e.g., the source input connector 200), split the power received via the input interface into two or three or more power channels (e.g., power channels A, B, and F), and conduct the split power along each of the power channels to the output 108 (e.g., source output connectors 202A-202C). For example, one such power channel A includes current monitor 210A in series with at least one of the power channels 114, comparator circuit 212A connected to at least one of the power channels 114, relay 214A in series with at least one of the power channels 114, fault state current measurement circuit 216A connected to at least one of the power channels 114, one or more fuses 206 in series with the power channels 114, and source output connector 202A. Other power channels B and F are similar. The power channels have a Class 2 or 3 rating, in some examples.

In some examples, the source input connector 200 is coupled or electrically connected to, and receives power from, a surgical display power supply or other type of power supply, such as a Class 1 power supply, via the input 106. In these examples, the source input connector 200 is part of a sub-assembly connector, which is part of a sub-assembly that can easily be changed to accommodate the connector type of any power supply. In some examples, these input connector sub-assemblies have a short pigtail terminated with a Molex Ultra-fit Connector Receptacle that lands to the SEM circuitry.

Figure 3:
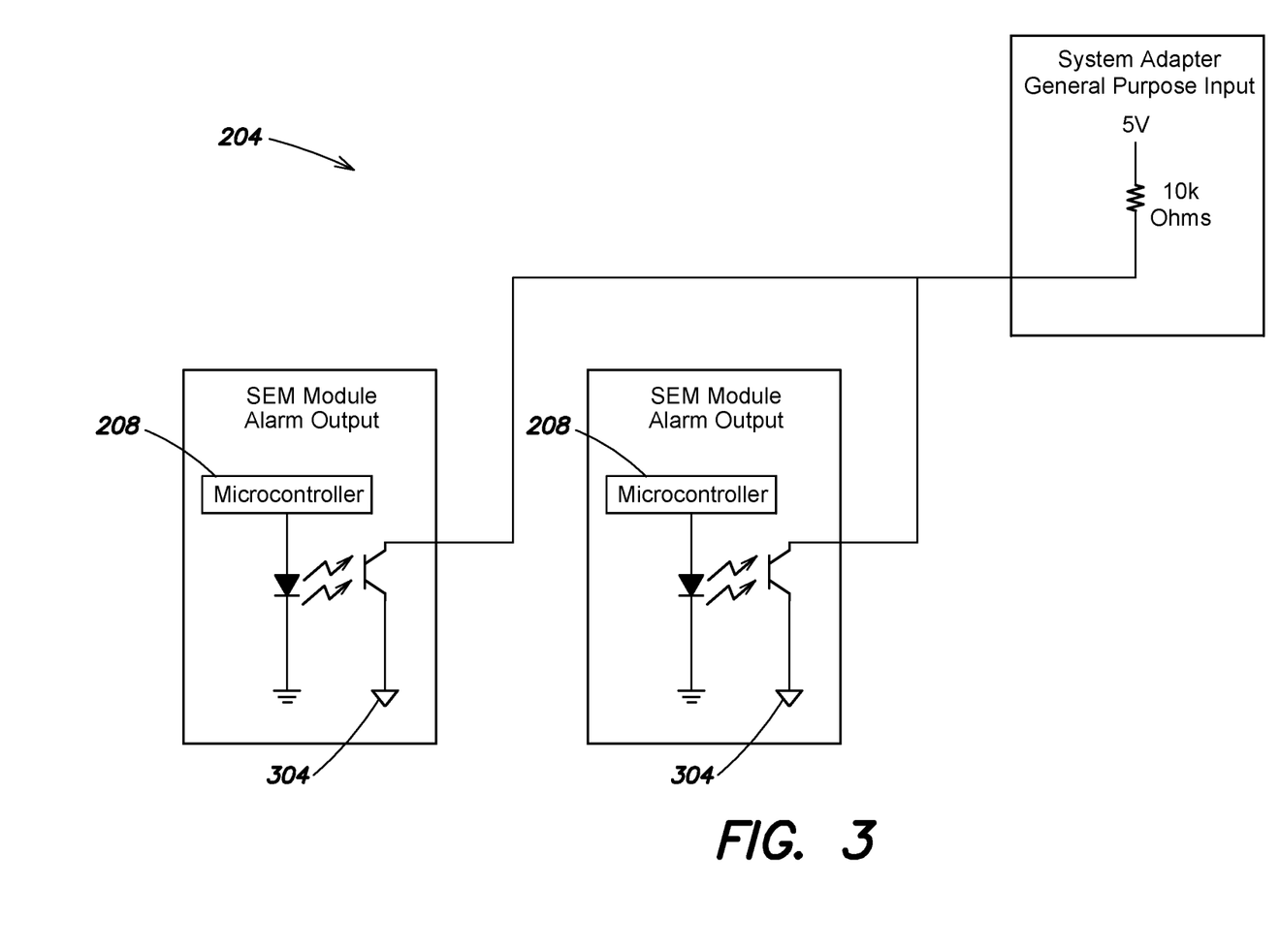
FIG. 3 is a schematic diagram illustrating two SEMs having a shared alarm bus in accordance with some examples of the present disclosure.

In some examples, the alarm output circuit 204 includes an optically isolated open-drain output 304 to annunciate fault conditions, such as shown in FIG. 3. In at least one example, a 5-pin Phoenix style header connector is used for this interface. Table 1 lists pin assignments used in one example.

TABLE 1

| Pin Number | Assignment |
| --- | --- |
| 1 | Alarm signal |
| 2 | Alarm ground |
| 3 | Connected to pin 4 |
| 4 | Connected to pin 3 |
| 5 | Alarm ground |

Further, in this example, pins 3-5 are used to detect if a wiring issue (e.g. connector unplugged) has occurred.

In some examples, the SEM 102 can be daisy-chained with additional SEMs. Where arranged in this configuration, the final SEM in the daisy-chain requires a jumper from pin 4 to 5 of the alarm connector in order to signify a completed alarm bus loop. FIG. 3 illustrates one example of two SEMs 302A, 302B on a shared alarm bus 204.

In some examples, each of the source output connectors 202A-202C is a 4-pin TE header connector formed to accept a mating plug that terminates cables connecting the SEM 102 to the LEM 104. Table 2 lists pin assignments used in one example.

TABLE 2

| Pin Number | Assignment |
| --- | --- |
| 1 | Functional Earth/Protective Earth |
| 2 | Power |
| 3 | Return |
| 4 | Cable Shield |

In some examples, the electronics and connectors of the SEM 102 are housed within an enclosure with an input end that exposes the source input connector 200 and an output end that exposes the source output connectors 202A-202C. The enclosure provides panel mount features so that either the input end or the output end can be exposed for connection. In some examples, the enclosure is conductive and connected to drains of input and output cabling. In these examples, the conductive enclosure is isolated from the panel mount features. Thus, a drain connection is carried through from the input interface to the output interface but is isolated from the split and combined power, return signals, and panel mount features. In some examples, the source input connector 200 and at least one first alarm light emitting diode (LED) are located on the input end. In some examples, the source output connectors 202A-202C and at least one second alarm LED are located on the output end.

Load End Module

Figure 4:
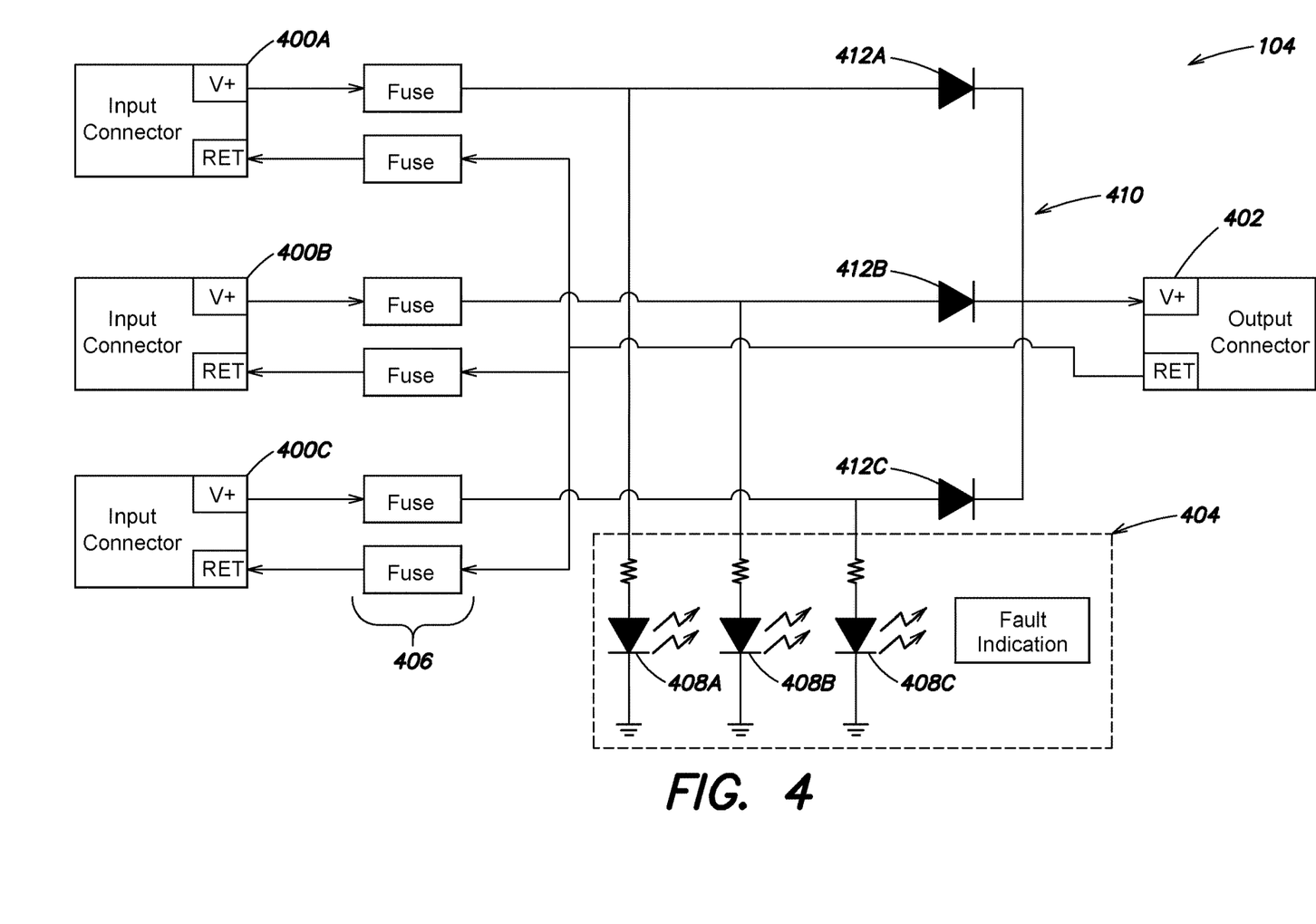
FIG. 4 is a block diagram illustrating a circuit of a load end module (LEM) in accordance with some examples of the present disclosure.

FIG. 4 illustrates electronics housed in the LEM 104 in accordance with some examples of the present disclosure. As shown in FIG. 4, the electronics of the LEM 104 include a plurality of load input connectors 400A-400C, a load output connector 402, an fault indication circuit 404, and additional circuitry.

In some examples, the LEM 104 is configured to receive the split power from the power channels and the source output connectors 202A-202C of the SEM 102 via the input 110 (e.g., the load input connectors 400A-400C), combine the two or three power channels into a single output channel (e.g., 10.5 A maximum), and provide the output channel to the output 112 (e.g., the load output connector 402). In some examples, the load input connectors 400A-400C are coupled or electrically connected to the output connectors 202A-202C via cables 114 that are connected to both the source output connectors 202A-202C and the load input connectors 400A-400C. In some examples, the output connector 402 is coupled to and supplies power to a Class 1 load such as a high-resolution display (e.g., a 4K surgical display). In some examples, the LEM 104 combines the two or three power channels through diode-ORing.

In some examples, each of the load input connectors 400A-400C is a 4-pin TE header connector formed to accept a mating plug that terminates cables the connecting the SEM 102 to the LEM 104 described above. Table 3 lists pin assignments used in one example.

TABLE 3

| Pin Number | Assignment |
| --- | --- |
| 1 | Functional Earth/Protective Earth |
| 2 | Power |
| 3 | Return |
| 4 | Cable Shield |

In some examples, the load output connector 402 includes a pigtail connector formed to mate with an exterior cable that is terminated by a connector compatible with the load. For instance, this connector may be of the same type as the connector of the power supply coupled to the input connector 200. In some examples, the pigtail output connector is modular and can be removed from the LEM 104 at any time to change the cable. This feature makes it easy to match a LEM to a specific load (e.g., a surgical display).

In some examples, the electronics and connectors of the LEM 104 are housed within an enclosure with an input end that exposes the load input connectors 400A-400C and an output end that exposes the load output connector 402. The enclosure provides plate mounting features for mounting to an electrically isolated mounting plate, which in turn can be mounted to a plate behind the load. In some examples, the enclosure is conductive and connected to drains of input and output cabling. Thus, a drain connection is carried through from the input interface to the output interface but is isolated from the split and combined power, return signals, and the mounting plate.

Additional Features

Some examples can include additional features as described below.

Class 1 to Class 2 Splitting

In some examples, the SEM 102 includes an internal jumper (not shown) to set the number of power channels (e.g., 2 or 3) into which the input power is split. The internal jumper may be a physical switch or a software controllable switch coupled to the microcontroller 208.

It is appreciated that even though a power supply has a class 1 rated output, the load to be driven by the power supply may require substantially less operating current—such that only two Class 2 channel conductors may be required. Where this situation exists, installation cost and complexity may be decreased.

Safety Current Limiting

In some examples, safety current limiting circuitry is provided in the form of fast acting and replaceable fuses 206 and 406. The fuses 206 and 406 help the power supply delivery system 100 comply with relevant codes and standards. As shown in the FIGS. 2 and 4, one of the fuses 206 and 406 is coupled to every Class 2 channel conductor. Additionally, there are no other components in the electrical path between the fuses 206 and 406 and their respective connectors (i.e., the output connectors 202A-202C and the input connectors 400A-400C).

In some examples, the SEM 102 includes functional current limiting circuitry to avoid nuisance blowing of the safety fuses. This circuitry includes the current monitors 210A-210C, the comparator circuits 212A-212A, and the relays 214A-214C.

The operation of the functional current limiting circuitry in at least one example will now be described. For ease and clarity of description, the functional current limiting circuitry of a single positive Class 2 channel conductor (i.e., power channel A) will be described. However, it is to be appreciated that the following description applies to the other power channels (B and C) as well. All three power channels (A, B, and C) have identical implementations and functions unless noted otherwise.

The functional current limiting circuitry (i.e., the current monitor 210A-210C, the comparator circuit 212A-212C, and the relay 214A-214C) monitors the positive Class 2 channel conductor current flowing within power channel A. When an overcurrent condition is detected the respective relay 214A-214C is actuated to open contacts that are in the positive conductor path, thereby interrupting the fault current.

The functional overcurrent set point is slightly lower than the safety current limiting fuse rating of the fuses 206 and 406. The actual set point is determined as a balance between maximizing the load current that the power supply delivery system 100 supports, avoiding nuisance safety fuse actuation, accounting for the maximum differential comparator voltage specification, and accounting for the maximum time it takes for the relay contacts of the relay 214A-214C to open when the relay coil is energized.

The current monitor 210A-210C uses a special integrated circuit (Texas Instruments INA168, in some examples) and a precision 0.01Ω resistor. The resistor is in the path of the positive conductor. The special integrated circuit receives two inputs, one from each side of the resistor. The special integrated circuit measures the voltage difference between these two inputs to determine the voltage drop across the resistor that is proportional to the current flowing through the resistor. The special integrated circuit provides a single voltage output that is proportional to the current measured. The voltage output of the special integrated circuit is relative to the return conductor. The special integrated circuit decouples its proportional voltage output from the positive conductor voltage presented to its input pins. This is important to:

[1] Ensure the power supply delivery system 100 can be used with a variety of manufacturers' power supplies over the full range of the power supply delivery system 100 rated input voltage rating without requiring component value adjustments at the time power supply delivery system 100 is manufactured or installed, and
[2] Ensure the comparator circuits 212A-212C have a consistent input voltage range. The output of the special integrated circuit feeds into respective comparator circuits 212A-212C.

The comparator circuit 212A-212C uses a voltage reference derived from the output of, for example, a 3.3 V regulator. A resistor divider fed by the 3.3 V regulator creates a 961 mV reference voltage that feeds into the negative input of the comparator circuit 212A-212C (note, a single reference voltage is fed to the comparators circuits 212A-212C of all three positive Class 2 channel conductors, in some examples). With, for example, a 0.01Ω current sense resistor and the proportional constant of the special integrated circuit, a trip point of approximately 961 mV translates into approximately a 3.364 A current limit trip point.

The output of the special integrated circuit of the current monitor 210A-210C feeds into the respective positive input of the comparator circuit 212A-212C. When the channel current rises to the point where the special integrated circuit output rises above approximately 961 mV, the comparator circuit 212A-212C output switches from a low to high voltage. This output drives a transistor that, in turn, energizes a coil of the respective relay 214A-214C.

The contacts of the relay 214A-214C are in the path of the respective positive Class 2 channel conductor. During normal operation the contacts are closed to allow current to flow to the LEM 104. When the comparator circuit 212A-212C drives the respective relay 214A-214C coils, the contacts open and interrupt current in the respective power channel.

The relay 214A-214C is a latching relay so that it maintains its state when its coils are de-energized. This is important because as soon as the relay 214A-214C contacts open the current in the respective power channel drops to nearly zero. The special integrated circuit output voltage of the current monitor 210A-210C immediately drops in response to this new condition, and the respective comparator circuit 212A-212C output is switched low as a result. If the relay 214A-214C was not latching, the relay 214A-214C would oscillate from closed to open to closed, etc. until the actual fault was removed from the channel.

Automatic Fault Recovery

Once one or more positive Class 2 channel conductors in the SEM 102 have experienced functional current limiting, the power supply delivery system 100 is either operating in a marginal condition or has stopped operating due to insufficient power delivery to the load. A fault condition, however, may only be temporary. It is undesirable to have a temporary fault render the power supply delivery system 100 inoperable such that, for example, a service call is required.

Thus, some examples of the power supply delivery system 100 include automatic fault recovery circuitry. In these examples, the automatic fault recovery circuitry includes the microcontroller 208 and the fault state current measurement circuits 216A-216C. The automatic fault recovery circuitry is configured to automatically return the power supply delivery system 100 to normal operation after a fault or faults have been addressed.

In general, the automatic fault recovery circuitry is configured to execute one or more of the following actions.

[1] During a fault state the current flowing through the faulted channel is monitored periodically (e.g. every 10 seconds).
[2] When the monitored current drops to a predetermined level (that indicates the fault may have been cleared), the functional current limiting relay is returned to normal operating mode.
[3] If the fault has not cleared functional current limiting will automatically switch the relay back to a fault state.

The periodic sampling of fault current noted in #1 is to avoid significantly reducing the lifespan of the relay (contacts). These actions are referred to collectively as "chirping."

Figure 5:
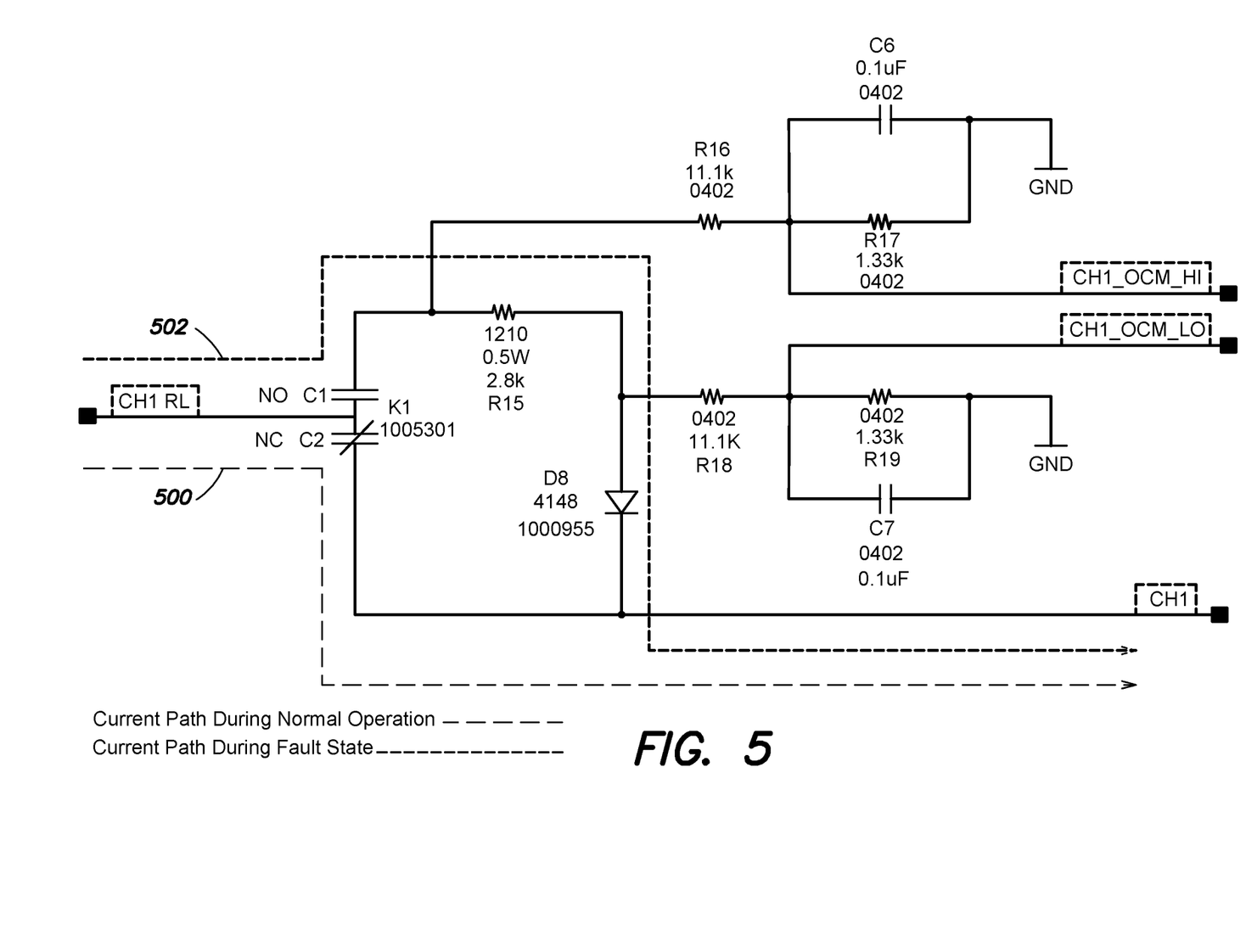
FIG. 5 is a circuit diagram illustrating current limiting relay contacts and fault state current measurement components in accordance with some examples of the present disclosure.

FIG. 5 illustrates current limiting relay K1 with contacts C1 and C2 and fault state current measurement components 216A-216C of one positive Class 2 channel conductor, in an example (other channels are similar). Note that the relay K1 used for functional current limiting has two contacts, one that is normally closed and one that is normally open. The normally closed contact passes the normal operating current to the output connectors 202A-202C (and on to the LEM 104). This is indicated in FIG. 5 by line 500.

When functional current limiting circuitry actuates the relay K1 (fault state), the normally closed contacts open and the normally open contacts close. In the fault state, no current can flow through the path indicated by the line 500. Instead current flows through the path indicated by line 502. The current is limited by resistor R15 to a very low (safe) level. Resistors R16/R17 and R18/R19 are respectively voltage dividers. The difference between the voltages at CH1_OCM_LO and HI is proportional to the voltage across resistor R15. The voltage across resistor R15 is indicative of the current flowing through it. The CH1_OCM_LO and HI signals feed into analog-to-digital converter (ADC) inputs of a microcontroller. The microcontroller firmware uses the ADC's to convert the voltage to numeric values. It then performs subtraction of the two values, the result of which is compared to a set point value hard coded in the firmware that represents a current level. When the measured voltage drops below the set point the fault current is low enough to indicate the fault may have cleared. The microcontroller then energizes the relay coil that resets the functional current limiting relay to a normal state.

Recombination of Class 2 Channels to a Class 1 Channel

In some examples, the LEM 104 recombines two or three Class 2 power channels into a single channel through a "diode OR" 410 arrangement such as shown in FIG. 4. The diodes 412A-412C illustrated in FIG. 4 also prevent a fault on a Class 2 circuit from affecting the other circuits.

Additional Fault Monitoring

In some examples, the microcontroller 208 uses additional ADC inputs to monitor the current passing through the individual positive Class 2 channel conductors (the voltage outputs of the special integrated circuits) and the combined return current from all three positive Class 2 channel conductors. The latter is accomplished using a single resistor (e.g., the current measurement circuit 218) in the SEM 102 through which the currents from all three return Class 2 channel conductors pass. The voltage across the resistor is provided to a microcontroller 208 ADC input. The microcontroller 208 adds the (current) values for the three positive Class 2 channel conductors together and compares that total to the return current value. If the total and the return current value differ by more than approximately 25%, the microcontroller 208 asserts an alarm annunciation for as long as the condition persists. The latter condition results in alarm annunciation without interruption of display power, as would a significant imbalance in current between channels. The benefit of these features is that they allow for an external (parent) system to record and/or report certain possible risk indications without rendering a display inoperable, which might otherwise lead to greater immediate risk.

Alarm Condition Annunciation

This alarm annunciation is implemented using a variety of techniques in various examples. For instance, one method uses the microcontroller 208. The microcontroller 208 asserts an alarm output signal for some fault conditions. The alarm output circuit 204 is an optically isolated open collector output. This allows multiple power supply delivery systems to be connected to a shared alarm bus that a parent system can monitor.

In some examples, the following conditions trigger assertion of the alarm output:

Overcurrent condition in any positive Class 2 channel conductor;

Combined overcurrent condition in the positive Class 2 channel conductors that are configured for use;

Greater than approximately 25% difference between any pair of active positive channel conductors;

Overcurrent condition in the combined return current of the Class 2 channel conductors; or Greater than approximately 25% difference between the combined currents of the positive Class 2 channel conductors (i.e., a sum of these currents) and the combined return current of the return conductors.

In some examples, a second method also uses the microcontroller 208 for the same set of alarm conditions noted above. The microcontroller 208 illuminates two LEDs (one on each end of the SEM 102 enclosure) to annunciate an alarm condition. This allows service personnel to easily identify the SEM 102 that has a fault. This is important where multiple SEMs share a common alarm output bus.

A third method annunciates a fault condition when voltage is lost on a positive Class 2 channel conductor. The LEM 104 provides three LEDs, one per channel, that are illuminated when voltage is present and not illuminated when voltage is not present. The LEDs are directly driven by the voltage on their respective positive Class 2 channel conductor. A fault condition may be the result of, for example but not limited to, an open circuit or a short circuit to a return conductor.

End-to-End Voltage Drop

In some examples, the voltage drop from the input of the SEM 102 to the output of the LEM 104 is designed to not exceed approximately 2V. Where the load is a display, voltage drop raises the current that passes through the power supply delivery system 100 and the Class 2 wiring because modern displays generally use internal switching power supplies to create the needed point of load voltage rails. Minimizing the voltage drop to below the design limit reduces the risk of nuisance functional current limiting and reduces the risk of an under-voltage condition that does not meet the minimum voltage required by the display.

Safety Standard Compliance

Certain examples of the SEM 102 and the LEM 104 can be certified to comply with the following safety standards:

IEC 60601-1:2012

CAN/CSA-C22.2 No. 60950-1-07+Am1 (2011)+Am2 (2014)

ANSI/UL 60950-1 2nd Edition+Am1 (2011)+Am2 (2014)

IEC 60950-1:2005 (Second Edition)+Am1:2009+Am2: 2013

EN 60950-1: 2006/A2: 2013

Insulation

Figure 6:
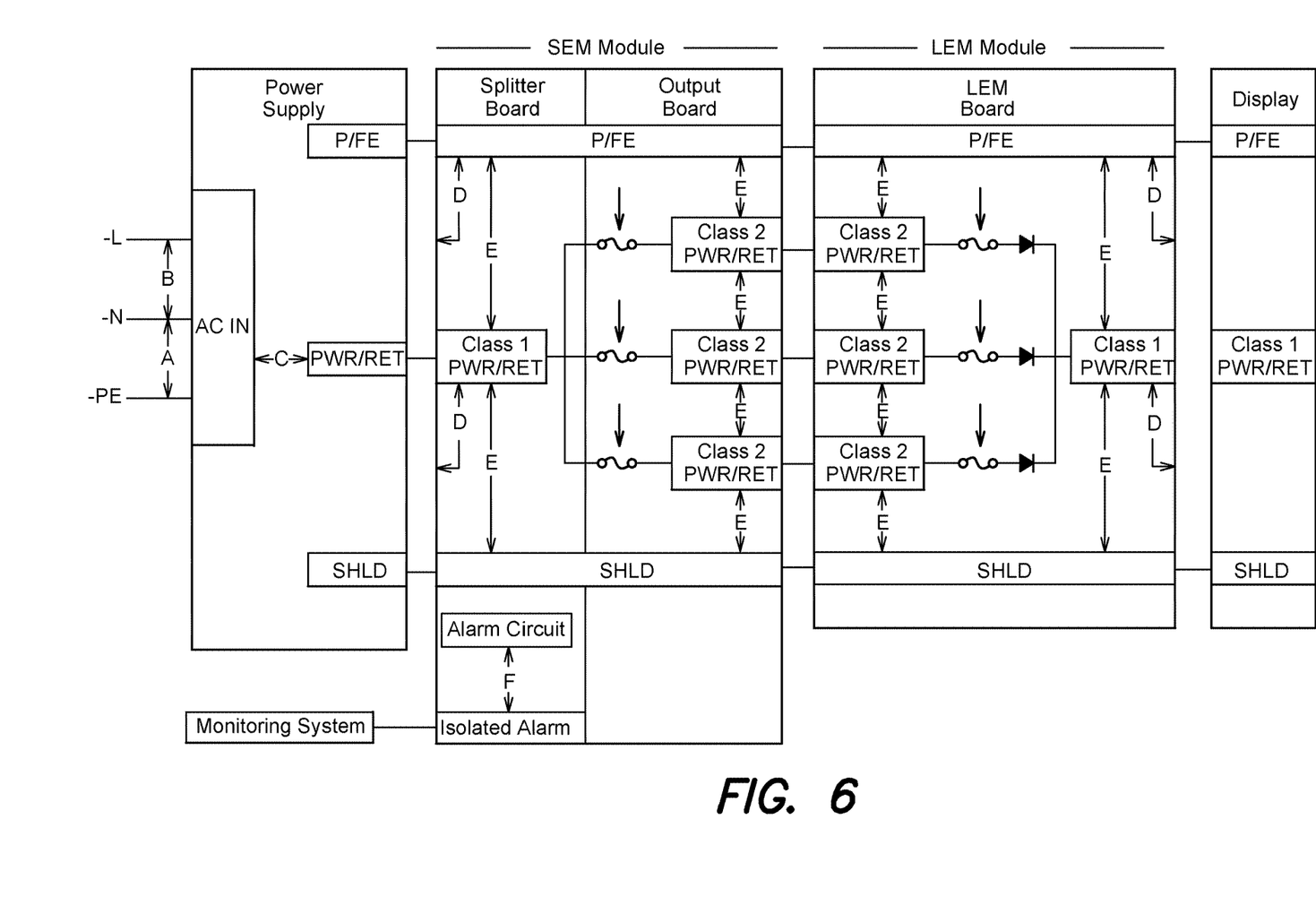
FIG. 6 is a schematic diagram illustrating an insulation layout within various components of the power supply delivery system in accordance with some examples of the present disclosure.

FIG. 6 illustrates an insulation layout present in some examples of the power supply delivery system 100. As shown in FIG. 6, regions A-C are provided by the display manufacturer's power supply. The power supply delivery system 100 meets the required 2 MOOP (Means of Operator Protection) of insulation (D) to the enclosures with minimum creepage of approximately 2.0 mm and minimum clearance of approximately 2.0 mm. Regions marked E provide the same insulation as region D, in some examples.

Cable Configurations

Some examples of the power supply delivery system 100 do not carry protective earth couplings due to the outputs of the supported power supply. In some examples, the SEM 102 and the LEM 104 are coupled to one other via 14/3 shielded cable with PLTC and/or CL2× and/or CL3× listing, or similar 3-conductor shielded cable approved for use pursuant to NEC Article 725.133.

ADDITIONAL EXAMPLES

A new item 725.144 has been introduced in the 2017 edition of NFPA 70, detailing the transmission of power and data using Class 2 and 3 circuits. This section, along with its new table, clarifies allowable limits for Class 2 and Class 3 power transmission using unshielded twisted pair (UTP) data cables (also referred to as "Category" cables). Listing agencies have begun to recognize new associated Class 2-LP and Class 3-LP cable designations. These allow for greater delivery of power and data over bundled category cabling. Cable manufacturers have responded by introducing "LP-rated" category cabling. Some surgical display manufacturers have introduced surgical displays having low voltage power supplies with outputs operating between 40- and 60-volts DC.

Some advantages of using category cabling include lower material and installation cost, as well as other logistical benefits arising from the relative abundance and ubiquity of this cable and associated connectors.

Table 725.144 of the 2017 edition of NFPA 70 allows that approximately 1.3 A may be carried by each conductor of an average 4-pair Class 2 or Class 3 data cable, while averaging the data for bundles of no more than 37 cables. Considering this table together with typical cable bundle sizes in clinical integration, a design limit around 1 A per wire is practical for such cabling. For example, for a display having a low voltage power supply with 48 volts DC output, approximately 200 W can be delivered on a single 4-Pair Class 2 cable, such as for a typical 4K surgical display.

Figure 7:
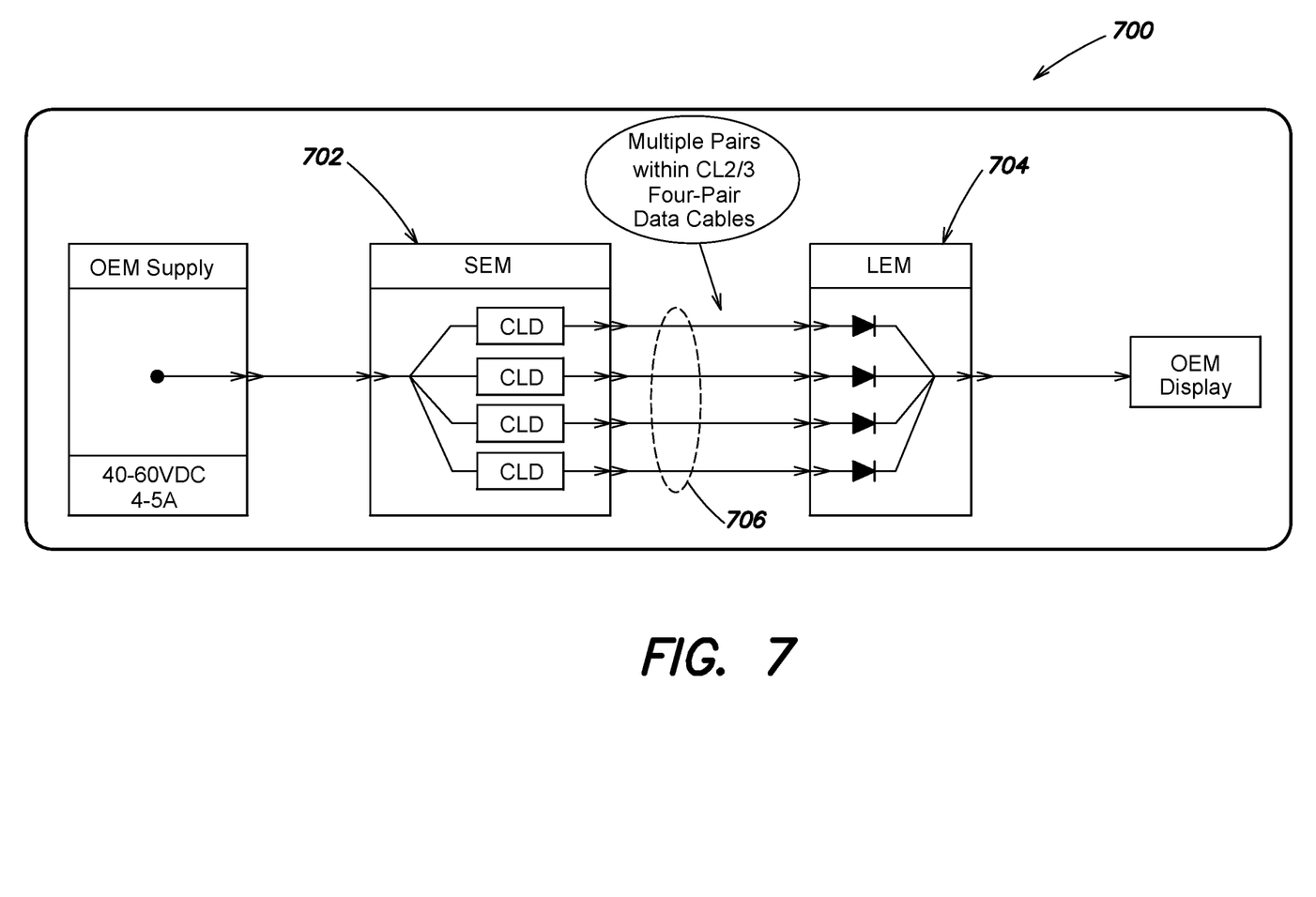
FIGS. 7 and 8 are schematic diagrams illustrating a power supply delivery system in accordance with another example of the present disclosure.
Figure 8:
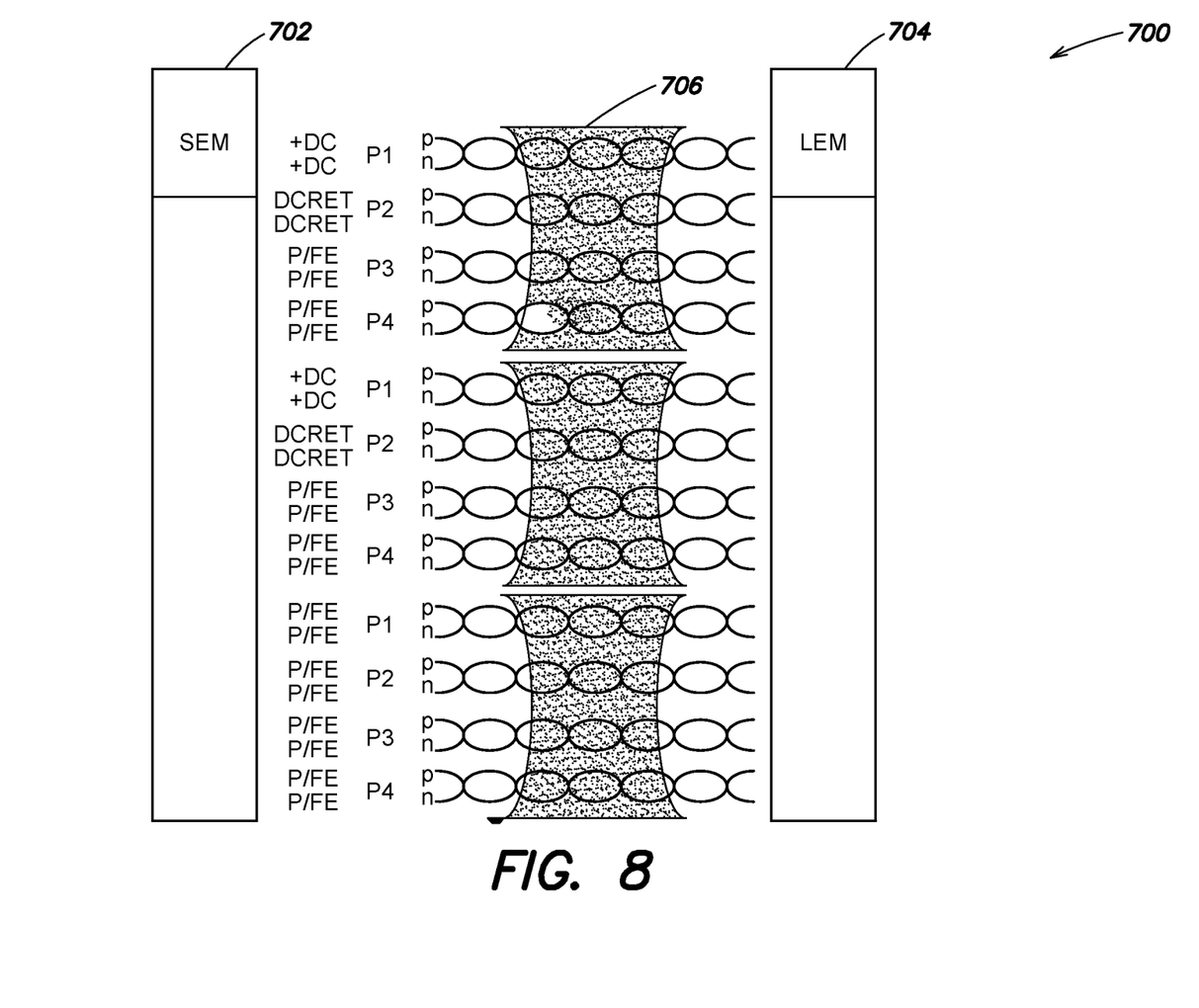

FIGS. 7 and 8 are schematic diagrams illustrating a power supply delivery system 700 in accordance with another example of the present disclosure. In contrast to the system 100 shown in FIG. 1, the system 700 uses at least four pairs of one or more category cables 706 to carry V+ and DC RETURN from SEM 702 to LEM 704. Since this implementation carries P/FE in addition to V+ and RET, it uses at least two four-pair category cables, allowing four pairs for V+/RET, and four pairs for P/FE. Additionally, a third category cable optionally doubles the number of P/FE conductors to eight pairs to handle cases where the distance from SEM 702 to LEM 704 exceeds a limit for four pair. The category cables of this implementation are shielded, in some examples.

Figure 9:
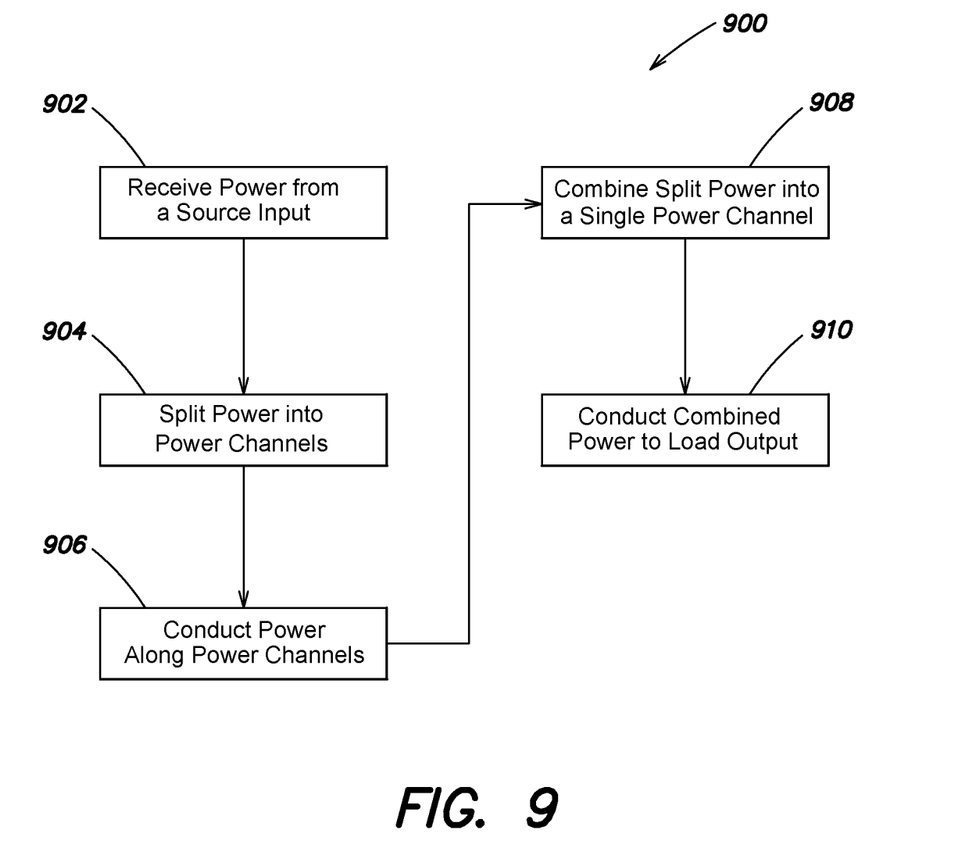
FIG. 9 is a flow diagram of an example method of delivering power to a load, in accordance with an example of the present disclosure.

FIG. 9 is a flow diagram of an example method 900 of delivering power to a load, in accordance with an example of the present disclosure. The method 900 includes receiving 902 power from an external power source (e.g., power supply 120) via a source input connector (e.g., source input connector 200) electrically connected to the external power source and splitting 904 the power received via the source input connector into a plurality of power channels (e.g., power channels 114) using first circuitry (e.g., SEM 100) electrically connected to the source input connector. The method 900 further includes conducting 906 the split power along each of the plurality of power channels to a plurality of source output connectors (e.g., (load output connectors 202A-202C) electrically connected to the source input connector using the first circuitry. The method 900 further includes combining 908 the split power received via a plurality of load input connectors (e.g., load input connectors 400A-400C) electrically connected to the plurality of source output connectors into a single power channel (e.g., power channel 410) using second circuitry (e.g., LEM 104) electrically connected to each of the plurality of load input connectors and to a load output connector (e.g., load output connector 402), and conducting 910 the combined power along the single power channel to the load output connector, thereby delivering the power to the load (e.g., load 130).

In some cases, the external power source includes a National Electrical Code 2017 (NEC) Class 1 power source, and the load includes an NEC Class 1 load. In some cases, the plurality of power channels and the single power channel includes a plurality of discrete NEC Class 2 rated cables. In some cases, the plurality of power channels includes a plurality of twisted pair data cables. In some cases, the method 900 further includes monitoring a current flowing within at least one of the plurality of power channels using a current monitor (e.g., current monitor 210A-210C) in series with at least one of the plurality of power channels, a comparator circuit (e.g., 212A-212C) connected to at least one of the plurality of power channels, and a relay (e.g., 214A-214C) in series with at least one of the plurality of power channels. In some cases, the method 900 further includes opening the relay when an overcurrent condition is detected. In some cases, an output of the current monitor feeds into an input of the comparator circuit, and an output of the comparator circuit drives the relay based on the output of the current monitor and a reference current.

What is claimed is:

1. A power supply delivery system comprising:
   an external power source adapted to supply power to a single device via a National Electrical Code (NEC) Class 1 circuit;
   a source end module configured to transmit power to a load end module, the source end module including:
      a source input connector configured to be electrically connected to the external power source;
      a plurality of source output connectors configured to be electrically connected to the source input connector; and
      a circuit electrically connected to the source input connector and to each of the plurality of source output connectors, the circuit configured to:
      split power received via the source input connector into a plurality of power channels for transmission below NEC Class 1; and
      conduct the split power along each of the plurality of power channels to the plurality of source output connectors for output via the plurality of source output connectors at below NEC Class 1.

2. The power supply delivery system of claim 1, wherein the load end module is configured to combine the split power and conduct the split power along a single power channel to the single device, wherein the single power channel is rated to handle NEC Class 1.

3. The power supply delivery system of claim 1, wherein the plurality of power channels includes a plurality of discrete NEC Class 2 or Class 3 rated cables.

4. The power supply delivery system of claim 1, wherein the plurality of power channels includes a plurality of twisted pair data cables.

5. The power supply delivery system of claim 1, wherein the circuit includes:
   a current monitor in series with at least one of the plurality of power channels;
   a comparator circuit connected to at least one of the plurality of power channels;
   a relay in series with at least one of the plurality of power channels;
   a microcontroller connected to the relay;
   a fault state current measurement circuit connected to at least one of the plurality of power channels; and
   one or more fuses in series with at least one of the plurality of power channels.

6. The power supply delivery system of claim 5, wherein the current monitor, the comparator circuit, and the relay are configured to monitor a current flowing within at least one of the plurality of power channels and to open the relay when an overcurrent condition is detected.

7. The power supply delivery system of claim 5, wherein an output of the current monitor feeds into an input of the comparator circuit, and wherein an output of the comparator circuit drives the relay based on the output of the current monitor and a reference current.

8. A power supply delivery system comprising:
a load end module configured to aggregate multiple low power channels into a single higher power output channel to power a single device, the load end module including:
a plurality of load input connectors configured to be electrically connected to a plurality of incoming low power channels;
a load output connector configured to be electrically connected to the single device; and
a circuit electrically connected to each of the plurality of load input connectors and to the load output connector, the circuit configured to:
aggregate the plurality of incoming low power channels into the single higher power output channel; and
conduct the aggregated power along the single higher power output channel to the load output connector.

9. The power supply delivery system of claim 8, wherein the single device is load includes a National Electrical Code 2017 (NEC) Class 1 load.

10. The power supply delivery system of claim 8, wherein the load end module includes a diode in series with the single power channel.

11. The power supply delivery system of claim 8, wherein the single device load is a surgical display.

12. A method of splitting power prior to delivery to a load, the method comprising:
receiving power from an external power source via a source input connector electrically connected to the external power source, wherein the external power source is adapted to supply power to a single device via a National Electrical Code (NEC) Class 1 circuit;
splitting the power received via the source input connector into a plurality of separate power channels using circuitry electrically connected to the source input connector, wherein each power channel of the plurality of separate power channels is below NEC Class 1; and
conducting the split power along each of the plurality of separate power channels to a plurality of source output connectors, wherein the plurality of source output connectors are configured to electrically connect to a load end module configured to combine the split power and conduct the split power along a single power channel to a single load, the single power channel being a NEC Class 1 circuit.

13. The method of claim 12, wherein the splitting the power into the plurality of separate power channels includes splitting the power into a plurality of discrete NEC Class 2 or Class 3 rated cables and/or a plurality of twisted pair data cables.

14. The method of claim 12, further comprising monitoring a current flowing within at least one of the plurality of separate power channels using:
a current monitor in series with at least one of the plurality of separate power channels;
a comparator circuit connected to at least one of the plurality of separate power channels; and
a relay in series with at least one of the plurality of separate power channels.

15. The method of claim 14, further comprising opening the relay when an overcurrent condition is detected based on the monitored current.

16. The method of claim 15, further comprising asserting an alarm annunciation when the overcurrent condition is detected based on at least one of:
a combined return current from all of the plurality of power channels; and
a difference between a combined current in each of the plurality of power channels and a combined return current from all of the plurality of power channels.

17. The method of claim 14, wherein an output of the current monitor feeds into an input of the comparator circuit, and wherein an output of the comparator circuit drives the relay based on the output of the current monitor and a reference current.

18. A method of combining split power to deliver power to a single load, the method comprising:
aggregating multiple low power channels received from a source end module via a plurality of load input connectors configured to electrically connect to a plurality of source output connectors of the source end module;
combining the multiple low power channels into a single power channel using circuitry electrically connected to each of the plurality of load input connectors and to a load output connector electrically connected to the single load; and
conducting the combined power along the single power channel to the load output connector, thereby delivering the power to the single load.

19. The method of claim 18, wherein the delivering the power to the single load includes delivering sufficient power to a National Electrical Code 2017 (NEC) Class 1 load.

20. A power supply delivery system comprising:
a load end module configured to receive split power from a source end module, the load end module including:
a plurality of load input connectors configured to be electrically connected to a plurality of source output connectors of the source end module;
a load output connector configured to be electrically connected to a load; and
a circuit electrically connected to each of the plurality of load input connectors and to the load output connector, the circuit configured to:
combine the split power received via the plurality of load input connectors into a single power channel; and
conduct the combined power along the single power channel to the load output connector,
wherein the load end module includes a diode in series with the single power channel.

* * * * *